US009205951B1

(12) United States Patent
Roman (10) Patent No.: US 9,205,951 B1
(45) Date of Patent: Dec. 8, 2015

(54) ALL-IN-ONE STACKABLE BULLETIN BOARD CADDY (71) Applicant: Josephine E. Roman, Dearborn Heights, MI (US)

(72) Inventor: Josephine E. Roman, Dearborn Heights, MI (US)

(*) Notice: Subject to any disclaimer, the term of this patent is extended or adjusted under 35 U.S.C. 154(b) by 0 days.

(21) Appl. No.: 14/339,530

(22) Filed: Jul. 24, 2014

(51) Int. Cl.
| B65D 43/03 | (2006.01) |
| B65D 21/02 | (2006.01) |
| B65D 25/24 | (2006.01) |
| B65D 25/10 | (2006.01) |
| B65D 43/02 | (2006.01) |
| B65D 55/02 | (2006.01) |
| B65D 25/28 | (2006.01) |

(52) U.S. Cl.
CPC ............ *B65D 21/0233* (2013.01); *B65D 25/10* (2013.01); *B65D 25/24* (2013.01); *B65D 25/28* (2013.01); *B65D 43/02* (2013.01); *B65D 55/02* (2013.01); *B65D 2525/283* (2013.01); *B65D 2543/00435* (2013.01)

(58) Field of Classification Search
CPC .... B65D 21/0233; B65D 25/24; B65D 25/10; B65D 25/28; B65D 43/02; B65D 55/02; B65D 2543/00435; B65D 2525/283; B65D 21/0234; B65D 21/0217; B65D 21/0219; B65D 21/022; B65D 21/0222; B65D 21/0223; B65D 51/249; B62B 3/16; B62B 3/165
See application file for complete search history.

(56) References Cited

U.S. PATENT DOCUMENTS

| 2,338,477 | A | * | 1/1944 | Wolters et al. ................. 220/812 |
| 2,765,099 | A | | 10/1956 | Lively |
| 3,376,046 | A | * | 4/1968 | Kivett et al. ............. 280/33.998 |
| 3,613,940 | A | * | 10/1971 | Davis ............................ 220/781 |
| 3,777,896 | A | | 12/1973 | Ehrlich |
| 3,912,158 | A | | 10/1975 | Taub |
| 4,091,953 | A | * | 5/1978 | Daenen ....................... 220/23.86 |
| 4,291,829 | A | * | 9/1981 | VanderLugt, Jr. ........ 229/125.17 |
| 4,316,540 | A | | 2/1982 | Lapham |
| 4,363,821 | A | * | 12/1982 | VanderLugt, Jr. ............. 426/393 |
| 4,688,675 | A | | 8/1987 | Miller et al. |
| 4,756,420 | A | | 7/1988 | Deaton |

(Continued)

OTHER PUBLICATIONS

Advertisement: www.orientaltrading.com, pp. 3 & 4, date unknown, RE-62/9570 Bulletin Board Storage, 2 pages.

(Continued)

*Primary Examiner* — Hau Phan
*Assistant Examiner* — Jacob Meyer
(74) *Attorney, Agent, or Firm* — J. Gordon Lewis (57) ABSTRACT

A reconfigurable bulletin board caddy includes rectangular inner and outer, open topped containers dimensioned to effect a slip-fit nesting engagement there-between. A reversible closure member includes a planer closure panel, a first stepped peripheral skirt extending normally from the planer closure panel in a first direction, and a second peripheral skirt extending normally from the planer closure panel in a second opposite direction, The stepped peripheral skirt forms first and second offset circumferential engagement surfaces. The first circumferential engagement surface sealingly engages the opening of the outer container and the second circumferential engagement surface simultaneously sealingly engages the opening of said inner container when said inner container is nestingly disposed within the first container. Alternatively, the second peripheral skirt engages the opening of the outer container and the second circumferential engagement surface simultaneously engages the bottom panel of the inner container when removed from the outer container.

20 Claims, 6 Drawing Sheets

(56) References Cited

U.S. PATENT DOCUMENTS

| | | | | |
|---|---|---|---|---|
| 5,042,674 | A * | 8/1991 | Ramsay et al. | 220/4.24 |
| 5,058,763 | A * | 10/1991 | Dickinson | 220/495.09 |
| 5,105,947 | A * | 4/1992 | Wise | 206/519 |
| 5,564,805 | A * | 10/1996 | Dickinson | 312/249.8 |
| 5,662,223 | A * | 9/1997 | Sylegard | 206/508 |
| 5,674,546 | A * | 10/1997 | Barnes et al. | 426/120 |
| 5,709,008 | A * | 1/1998 | Dickinson | 16/45 |
| 5,713,509 | A | 2/1998 | Correll | |
| 5,718,168 | A | 2/1998 | Harrington | |
| 5,718,350 | A * | 2/1998 | Williams | 220/326 |
| 5,906,291 | A * | 5/1999 | Mann et al. | 220/756 |
| 5,924,572 | A * | 7/1999 | Cope | 206/518 |
| 6,105,980 | A | 8/2000 | Cino et al. | |
| 6,109,456 | A | 8/2000 | Heinz | |
| 6,886,694 | B2 * | 5/2005 | McNeeley et al. | 206/505 |
| 6,983,946 | B2 * | 1/2006 | Sullivan et al. | 280/79.11 |
| 7,124,891 | B2 * | 10/2006 | Kolar et al. | 206/515 |
| 7,188,745 | B2 * | 3/2007 | Schermel | 220/23.4 |
| 7,205,016 | B2 * | 4/2007 | Garwood | 426/108 |
| 7,255,231 | B2 * | 8/2007 | Andrews et al. | 206/521.1 |
| 7,303,075 | B2 * | 12/2007 | Herbert et al. | 206/515 |
| 7,364,172 | B1 * | 4/2008 | Archer | 280/79.5 |
| 8,157,094 | B2 * | 4/2012 | Schiessl | 206/457 |
| 8,256,242 | B1 * | 9/2012 | Evans | 62/457.7 |
| 8,714,568 | B2 * | 5/2014 | Allam et al. | 280/30 |
| 8,727,163 | B2 * | 5/2014 | Chrisman | 220/254.3 |
| 9,050,852 | B1 * | 6/2015 | Abuzarifah | 220/570 |
| 2002/0175172 | A1 * | 11/2002 | Diesterbeck | 220/782 |
| 2003/0136699 | A1 * | 7/2003 | McNeeley et al. | 206/518 |
| 2004/0035867 | A1 * | 2/2004 | Schultz et al. | 220/212 |
| 2004/0112906 | A1 * | 6/2004 | von Holdt, Jr. | 220/657 |
| 2004/0195793 | A1 * | 10/2004 | Sullivan et al. | 280/79.11 |
| 2005/0051549 | A1 * | 3/2005 | Nelson | 220/23.83 |
| 2005/0109654 | A1 * | 5/2005 | Kolar et al. | 206/518 |
| 2006/0119060 | A1 * | 6/2006 | Sullivan et al. | 280/79.11 |
| 2006/0201943 | A1 * | 9/2006 | Uffner et al. | 220/23.83 |
| 2007/0045146 | A1 * | 3/2007 | Herbert et al. | 206/515 |
| 2007/0202221 | A1 * | 8/2007 | Hinze et al. | 426/129 |
| 2007/0235963 | A1 * | 10/2007 | Killinger et al. | 280/47.26 |
| 2008/0047855 | A1 | 2/2008 | Izen | |
| 2008/0296183 | A1 * | 12/2008 | Meers | 206/232 |
| 2010/0108556 | A1 * | 5/2010 | Claffy | 206/508 |
| 2011/0186458 | A1 * | 8/2011 | Schiessl | 206/457 |
| 2012/0292867 | A1 * | 11/2012 | Allam et al. | 280/30 |
| 2014/0014539 | A1 | 1/2014 | Jatwes | |
| 2014/0251996 | A1 * | 9/2014 | Chrisman, Joel | 220/254.3 |
| 2014/0360899 | A1 * | 12/2014 | Huang | 206/278 |
| 2015/0151566 | A1 * | 6/2015 | Abuzarifah | 220/570 |

OTHER PUBLICATIONS

Advertisement: www.HomeroomDirect.com, pp. 25 & 26, date unknown, CU535 Plastic Pendaflex File, 2 pages.

Advertisement: www.reallygoodstuff.com/product/39+x+25+super+file+poster+organizer+floor+stan..., Aug. 4, 2011, 1 page.

Advertisement: www.stacksandstacks.com/html/8993_home-organizer-box-warehouse.htm, Feb. 12, 2006, 2 pages.

Advertisement: www.stacksandstacks.com/html/75071_clear-storage-box-iris-130-qt.-set-of-3-stack..., Feb. 12, 2006, 2 pages.

Advertisement: www.stacksansstacks.com/html/75114_storage-box-iris-74-qt.htm, Feb. 12, 2006, 2 pages.

* cited by examiner

ALL-IN-ONE STACKABLE BULLETIN BOARD CADDY

TECHNICAL FIELD

The present invention relates to the field of storage receptacles, and more particularly the present invention relates to the field of storage receptacles configured for organizing and protecting certain classes of goods. Even more particularly, the present invention relates to the field of storage receptacles which can be functionally combined with similar or related receptacles.

BACKGROUND OF THE INVENTION

A search of issued U.S. Patents in the field of nesting containers and related apparatus reveals U.S. patents related generally to the field of the present invention but which do not anticipate nor disclose the device of the present invention. The discovered U.S. patents relating generally to the present invention are discussed herein below.

U.S. Pat. No. 4,316,540 to Lapham entitled "Nesting or Stacking Box" discloses pairs of open-top containers that can be stacked, one upon the other without covers or reorientation of one of the pair relative to the other. Similarly formed containers of multiple pairs can be nested for storage or transportation as empties. A pair of complementary containers are of similar polygonal shape in which the sidewalls are formed as complimentary approximations of sine waves (e.g., sinusoids) having similar amplitudes, but whose frequencies are spatially displaced sufficiently so that interference is created between the ingoing and outgoing portions of a sufficient number of half waves forming the wave train so that the bottom portions of such waves on one container land on the top of oppositely phased waves on the complimentary container. In use of multiple sets of pairs, similarly formed containers are identically marked or coded so that a workman (or automatic handling equipment) can readily identify whether a particular container will stack with another container of the pair, or nest with a similarly formed container. In embodiments described in the '540 patent, square boxes and approximately circular pails have been described.

U.S. Pat. No. 4,688,675 to Miller et al. entitled "Nesting Box with Reduced Lid Flares" discloses a plastic molded tote box having one lid or opposed lids that will shingle with other lids in the open position when the box and like boxes are nested, the maximum horizontal dimension for the shingled lids, as measured outwardly from the adjacent box side wall (e.g., lid flare), is reduced by tapering the lid rib structure toward the hinge, and/or by tapering the outboard lid skirt toward the hinge, and/or by flaring one or more lid flanges, particularly the inboard flange. The latter two structural features permit increased nesting of the lid side skirts or channels, which in the closed position of the lid overlie the box side walls.

U.S. Pat. No. 6,105,980 to Cino et al. entitled "Box for Use with a Dolly as a Box and Dolly System" discloses a box and a dolly wherein the box comprises a plurality of substantially upright walls with at least one of the walls having at least two surfaces disposed in an offsetting relationship for forming an overhang and wherein the dolly comprises at least one complimentary surface for engaging the overhang to support the box along the overhang. The dolly does not have to be a horizontal platform typical of conventional dollies.

U.S. Pat. No. 4,765,420 to Deaton entitled "Multi Size Nesting Containers with Anti-Jamming" discloses a tote box system which employs two sets of nesting boxes that are identical except for side wall height that provides different volumes and except for bottom configuration that prevents bottom damage when a tall container is nested within a short container. The bottom configuration is such that there are flat engaging horizontal surfaces supporting the tall box on the short box without substantial engagement between reinforcing channels or like slanted vertical portions of the bottom that would otherwise have a strong wedging action if they fully engaged, particularly with a large stack of nested boxes.

U.S. Pat. No. 5,718,168 to Harrington entitled "Trash and Recycling Center" discloses a trash and recycling center having a modular trash receptacle unit and a modular recycling receptacle. The trash receptacle unit has at least two interior compartments and a movable lid. A trash bag can be placed in one compartment and used newspapers can be stored in the other compartment. The recycling receptacle unit has a top with a can crusher, an empty can storage area, and a slot for depositing crushed cans into the interior of the recycling receptacle. The interior of the recycling receptacle can have multiple shelves or storage drawers or, can have a single storage bin. The recycling receptacle can also have a removable counter top recycling unit.

U.S. Pat. No. 3,777,896 to Ehrlich entitled "Combined Display and Storage Rack" discloses a swingable storage rack, preferably for posters, paintings, and the like. The rack is provided with support means for pivoting about a supporting structure. Marginal holding means are provided along opposite faces thereof for displaying a work of art along each of the opposing faces. Gravity-fed storage means are provided between the display surfaces for holding and storing a plurality of copies of the works of art being displayed, which are maintained within the storage portion in tubular form. Dispensing means are provided at the bottom end thereof whereby the lowermost copy may be removed, causing the remaining copies to feed downwardly by gravity. The copy to be dispensed is lifted outwardly in a direction transverse to the plane of the work of art being displayed. Alternatively, the bottom most copy of the work of art being displayed may be drawn outwardly therefrom along a line substantially parallel to the plane of the work of art being displayed. Furthermore, a plurality of such combined display-storage racks may be pivotally mounted within a suitable support, whereby all such racks are swingable so as to facilitate observation of each of the works of art being displayed.

U.S. Pat. No. 6,109,456 to Heinz entitled "Support Device for Hanging Sheet-like Objects Using Thin Support Tabs" discloses holding frames for hanging sheets of documents, such as posters and charts for storage, retrieval and reorganization of the stored items. Each stored sheet has one or more flat flexible plastic tabs with holes and slits attached to the back top edge. The spacing of the tabs matches the width of the storage frame. The holding frames can be used in two positions, a storage position and a selection position. In the selection position the stored items are easy to separate, review and locate. In the storage position the items are packed tightly. The holding frames are removable from the hanging facility to change the position or for transportation to different locations.

Although application-specific packaging is known for various industrial and commercial applications, container systems for organizing, protecting and storing materials for classroom application are not generally available. In particular, materials employed for a classroom bulletin board application can be fragile and are typically employed for short periods of time, such as during specific classroom topical discussions, lessons, or holiday seasons. Storage systems which are compact, lightweight and inexpensive, while efficiently organizing and storing such materials over lengthy periods of time, often do not adequately protect the materials (e.g., poster boards), which often emerge from storage dog-eared and unsuitable for long term re-use.

Furthermore, during prolonged periods of storage, such as during summer vacation, while classes are not being held, the classrooms are often reorganized for maintenance or otherwise made available for other activities. During such times, the stored materials are vulnerable to unauthorized use by non-teachers who have access to the building. Typically available storage containers cannot be secured, such as with a lock, to avoid such unauthorized access and pilfering.

None of the above listed U.S. patents disclose or suggest an all-in-one reconfigurable stackable bulletin board caddy of the present invention.

SUMMARY OF THE INVENTION

The forgoing problems and limitations are overcome and other advantages are provided by a new and improved all-in-one stackable bulletin board caddy described herein.

It is an object of the present invention to provide a secure, portable inexpensive large multi-compartment plastic caddy unit for organizing and storing standard bulletin board posters as well as providing separate storage for associated materials such as trim, rolled posters/bulletin board paper and the like. Furthermore, the various components can be nested to minimize total package volume requirements at original point of sale or long term empty storage.

The present invention provides a reconfigurable bulletin board caddy including rectangular inner and outer, open topped containers dimensioned to effect a slip-fit nesting engagement there-between. A reversible closure member includes a planar closure panel, a first stepped peripheral skirt extending normally from the planar closure panel in a first direction, and a second peripheral skirt extending normally from the planar closure panel in a second opposite direction. The stepped peripheral skirt forms first and second offset circumferential engagement surfaces. The first circumferential engagement surface engages and seals the opening of the outer container and the second circumferential engagement surface simultaneously engages and seals the opening of said inner container when said inner container is nestingly disposed within the first container. Alternatively, the second peripheral skirt engages the opening of the outer container and the second circumferential engagement surface simultaneously engages the bottom panel of the inner container when removed from the outer container. This arrangement provides a robust, lightweight and inexpensive apparatus for organizing and storing materials repeatedly employed for bulletin boards, particularly in a schoolroom setting.

In one embodiment, a reconfigurable bulletin board caddy includes an outer container defining a rectangular cavity and an upwardly facing opening and an inner container defining a rectangular cavity and an upwardly facing opening. The outer and inner containers are configured to effect a slip-fit nesting engagement there-between. A reversible closure member includes a closure panel, a first stepped peripheral skirt extending normally from the closure panel in a first direction, and a second peripheral skirt extending normally from the closure panel in a second opposite direction. The first stepped peripheral skirt forms a first circumferential engagement surface and a second circumferential engagement surface is radially offset from the first circumferential engagement surface. The first circumferential engagement surface is operative to engage and seal wall edges adjacent the opening of the outer container and the second circumferential engagement surface is operative to simultaneously engage and seal wall edges adjacent the opening of said inner container when said second container is disposed within said first container. Lastly, the second peripheral skirt is operative to engage and seal the opening of the outer container and the second circumferential engagement surface is operative to simultaneously engage a bottom panel of the inner container when the inner container is removed from the outer container.

According to another aspect of the invention, a second closure member operative to engage and seal the opening of the inner container when the inner container is removed from the outer container. This arrangement enables separate placement and closure of the two containers.

According to still another aspect of the invention, a first pair of cooperating opposed hanger supporting combs carried on the end panels of the outer container, and a second pair of opposed hanger supporting combs carried on the end panels of the inner container, wherein the first pair of cooperating opposed hanger supporting combs and the second pair of cooperating opposed hanger supporting combs are laterally dimensionally equidistant, enabling application of commonly dimensioned hangers within both of the inner and outer containers.

According to yet another aspect of the invention, a generally rectangular receiver container having integrally formed left and right end panels, front and rear side panels and a bottom panel collectively defines a rectangular cavity forming an upwardly facing opening, and a trim storage bin having integrally formed front and rear side panels, left and right end panels and a bottom panel collectively defines a rectangular cavity forming a laterally outwardly facing opening, wherein the trim storage bin has a movable panel operative for selective displacement between an open position and a closed position. Furthermore, the movable panel is locked within the closed position whenever the trim storage bin is disposed within the rectangular cavity of the receiver, the left end panel is integrally formed with the right end panel of the outer storage container, and the trim storage bin is vertically elongated and has a characteristic nominal vertical dimension of substantially twice the nominal vertical dimension of said recess. This arrangement enables separate secure storage of outsize bulletin board materials such as border trim.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which:

FIG. 3A, is a broken, cross-sectional plan view of a portion of the bulletin board caddy assembly of FIG. 3 on a greatly enlarged scale illustrating the typical interfit of the reversible closure member with both the upper edge of the outer storage container and the bottom portion of the inner storage container;

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

In the following Detailed Description, reference is made to the accompanying drawings, which form a part thereof, and in which is shown by way of illustration specific embodiments in which the invention may be practiced. In this regard, directional terminology, such as "top", "bottom", "front", "back", "leading", "trailing", etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Definitionally, the terms "integral" and "integrally formed" are deemed to mean either formed from a single mass of homogeneous material, or formed from discrete elements of (dis)similar materials performing the described structure and functionality.

It is to be understood that the features of the various exemplary embodiments described herein may be combined with each other, unless specifically noted otherwise.

Figure 1:
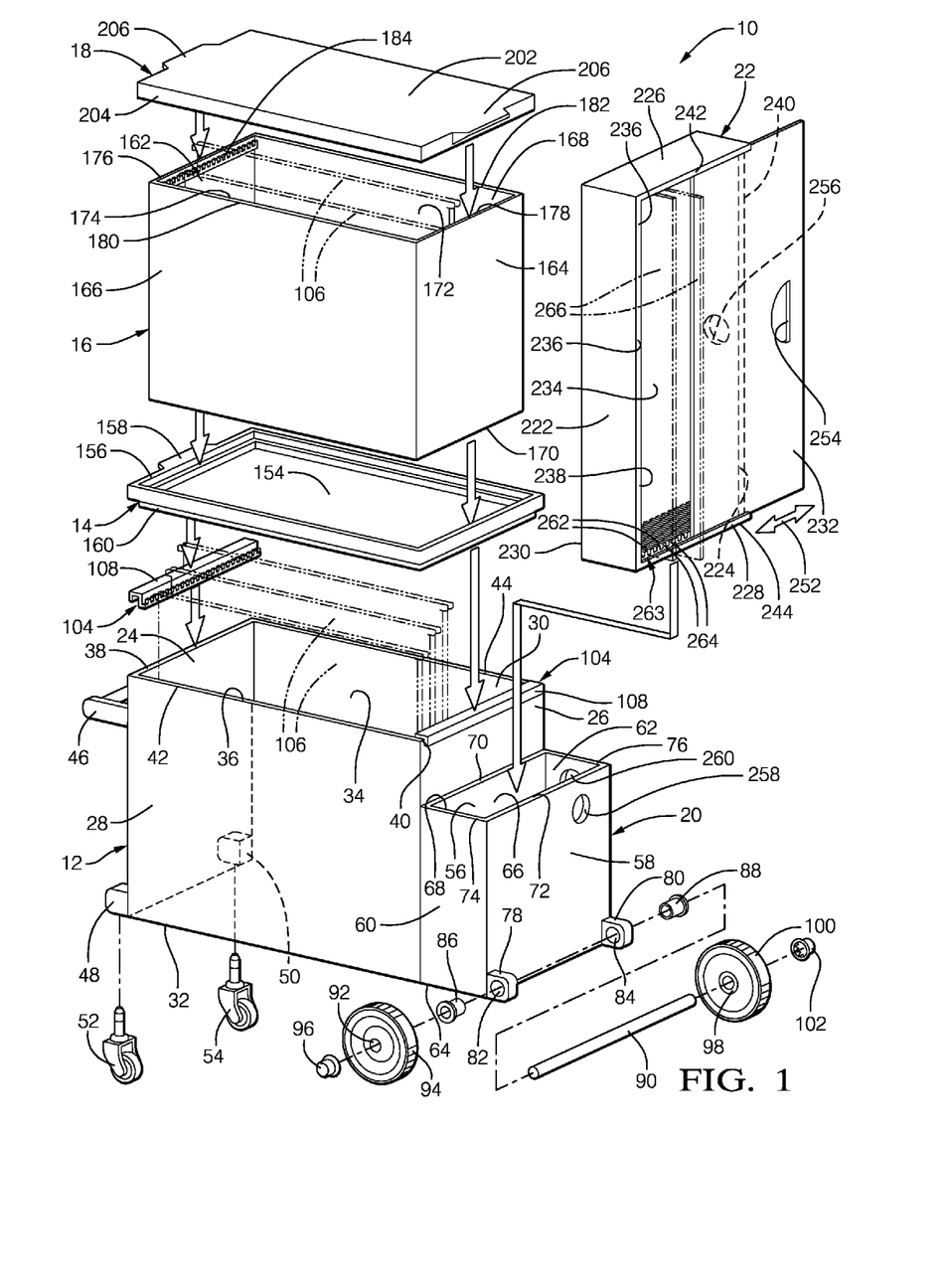
FIG. 1, is an exploded perspective view of an all-in-one stackable bulletin board caddy assembly embodying the present invention.

Referring to FIG. 1, a preferred embodiment of a stackable bulletin board caddy assembly 10 is depicted in an exploded perspective view to illustrate principle elements and features, as well as their respective juxtaposition in various applications. The stackable bulletin board caddy assembly 10 includes an outer storage container 12, a reconfigurable closure member 14, an inner storage container 16, and an upper closure member 18 configured for nesting or vertical stacking. The outer storage container 12 supports a receiver 20 for supporting a trim storage unit 22.

The outer storage container 12 is rectangular in form, including left and right vertically extending planar end panels 24 and 26, respectively, front and rear vertically extending planar side panels 28 and 30, respectively, and a horizontally extending planar bottom panel 32. The end panels 24 and 26, side panels 28 and 30 and bottom panel 32 are integrally formed, such as with injection molded plastic material, to define a relatively rigid structure forming a rectangular cavity 34 which is entirely closed with the sole exception of a rectangular upwardly facing opening 36 defined by the uppermost continuous edges 38 and 40 of the end panels 24 and 26, respectively, and the uppermost continuous edges 42 and 44 of the front and rear side panels 28 and 30.

A horizontally elongated handle assembly or pull bar 46 is integrally formed on the outer surface of the left end panel 24 of the outer storage container 12. Front and rear wheel mounts 48 and 50, respectively, are integrally formed on the outer surface of the left end panel 24. The front and rear wheel mounts 48 and 50, respectively, are horizontally spaced apart and receive multi-axis wheeled dollies 52 and 54, respectively, to provide stability, support and maneuverability for the overall stackable bulletin board caddy assembly 10. The wheeled dollies 52 and 54 can include "rocker lockers" (not illustrated) operable for temporarily parking the stackable bulletin board caddy assembly 10 by preventing rotation of the wheels of the dollies 52 and 54. The pull bar 46 and the front and rear wheel mounts 48 and 50, respectively, are formed externally of the left end panel 24 so as to avoid any intrusion within the rectangular cavity 34.

The receiver 20 is rectangular in form, including left and right vertically extending planar end panels 56 and 58, respectively, front and rear vertically extending planar side panels 60 and 62, respectively, and a horizontally extending planar bottom panel 64. The end panels 56 and 58, side panels 60 and 62, and bottom panel 64 are integrally formed, such as with injection molded plastic material, to define a relatively rigid structure forming a rectangular cavity 66 which is substantially closed with the exception of a rectangular upwardly facing opening 68 defined by the uppermost continuous edges 70 and 72 of the end panels 56 and 58, respectively, and the uppermost continuous edges 74 and 76 of the front and rear side panels 60 and 62. The left end panel 56 of the receiver 20 can be discretely formed from the right end panel 26 of the outer storage container 12 and affixed thereto or commonly formed as a single homogenous member.

Front and rear axle mounts 78 and 80, respectively, are integrally formed on the outer surface of the right end panel 58 of the receiver 20. The front and rear axle mounts 78 and 80, respectively, are horizontally spaced apart and form axially aligned through passages 82 and 84, respectively, for receiving and supporting front and rear axle bushings 86 and 88, respectively. An axle 90, formed of metal, composite material or other suitable material, extends through the bushings 86 and 88. A front end of the axle 90 emerging from bushing 86, extends through a through passage 92 of a front wheel 94, which is affixed to the axle 90 by a push clip 96. A rear end of the axle 90 emerging from bushing 88, extends through a through passage 98 of a rear wheel 100, which is affixed to the axle 90 by a push clip 102. The wheels 94 and 100 are preferably formed of hard rubber, metal, composite materials or the like.

As so far described, the combined outer storage container 12, wheeled dollies 52 and 54, respectively, pull bar 46, receiver 20 and wheels 94 and 100 form a robust, easily maneuverable base unit for the stackable bulletin board caddy assembly 10.

Figure 3:
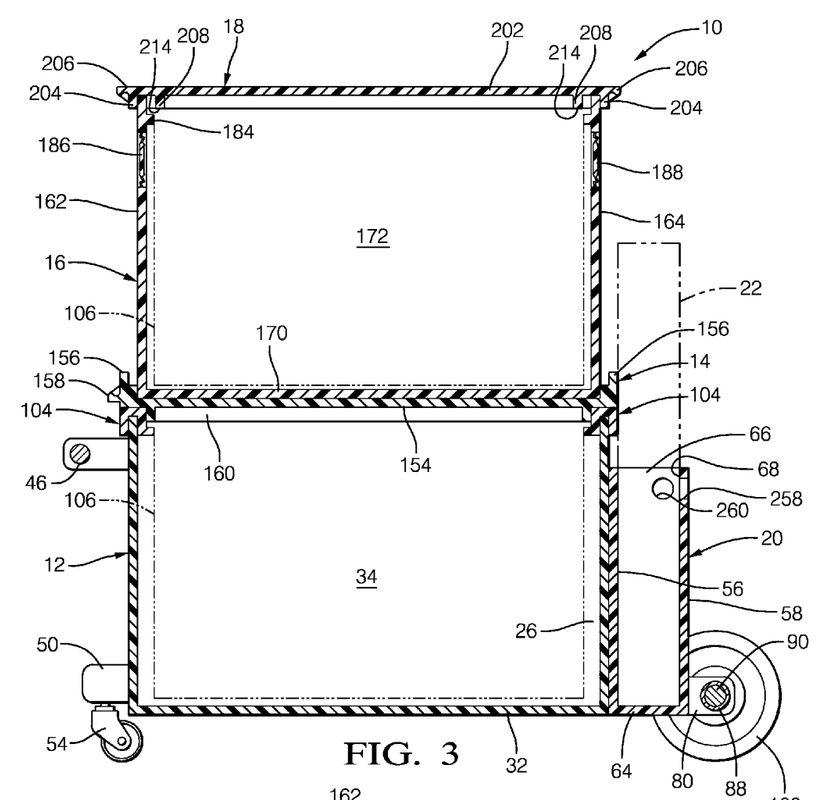
FIG. 3, is a cross-sectional plan view of the bulletin board caddy assembly of FIG. 1 in an expanded configuration wherein both of the two main containers, as well as a separate trim storage unit, are separately accessible.
Figures 4, 5:
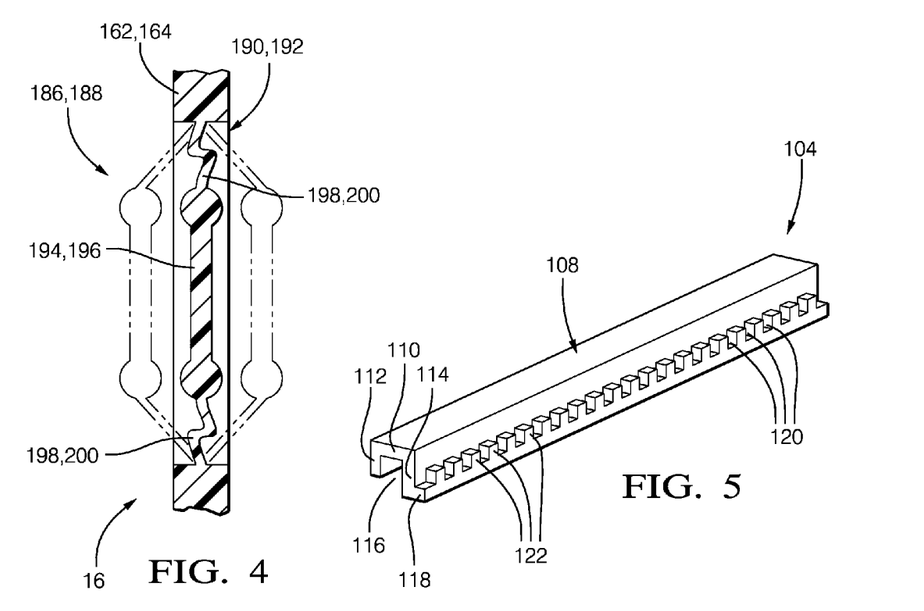
FIG. 4, is a broken, cross-sectional view of a hand-hold detail of the bulletin board caddy assembly of FIG. 1 on an enlarged scale, wherein the hand-hold detail can be resiliently manually displaced outwardly to facilitate gripping an interior surface of the inner container and can be alternatively resiliently manually displaced inwardly to facilitate gripping an exterior surface of the inner container.
FIG. 5, is a perspective view of one of two hanger spacer combs employed in the outer container of the bulletin board caddy assembly of FIG. 1.

Referring to FIGS. 1, 3 and 5, in application, the stackable bulletin board caddy assembly 10 employs two opposed hanger, spacer combs 104 for supporting and positioning hangers 106 (illustrated in phantom) within the rectangular cavity 34 formed by the outer storage container 12. The spacer combs 104 are identical or form a mirror image of one another. Each spacer comb 104 is elongated, having a generally inverted U-shaped body 108 formed by a base portion 110, an outer flange portion 112 and an inner flange portion 114 cooperating to define a channel 116. The inner flange portion 114 transitions into a foot portion 118 extending outwardly from the inner flange portion 114. The inner flange portion 114 has the same nominal thickness as the left and right end panels 24 and 26 of the outer storage container 12.

The foot portion 118 of each spacer comb 104 forms a plurality of alternating ledge segments 120 and spacer segments 122. The length of each spacer comb 104 equals the depth of the rectangular cavity 34 of the outer storage container 12. The width of each channel 116 equals, or is slightly less than the nominal thickness of the left and right end panels 24 and 26, respectively. The two spacer combs 104 are mounted on the upper edges 24 and 26 of the left and right end panels 24 and 26, respectively, which are slip fit or interference fit within the channels 116 with the ledge segments 120 and spacer segments 122 aligned and facing one another.

Although the standardized width of the ledge segments 120 and the standardized width of the spacer segments 122 can vary as a function of the weight of the materials (e.g., poster boards) intended for storage within the stackable bulletin board caddy assembly 10, fixed standard dimensions of 0.50 cm for all ledge segments 120 and all spacer segments 122 is acceptable for the application contemplated.

Figure 7:
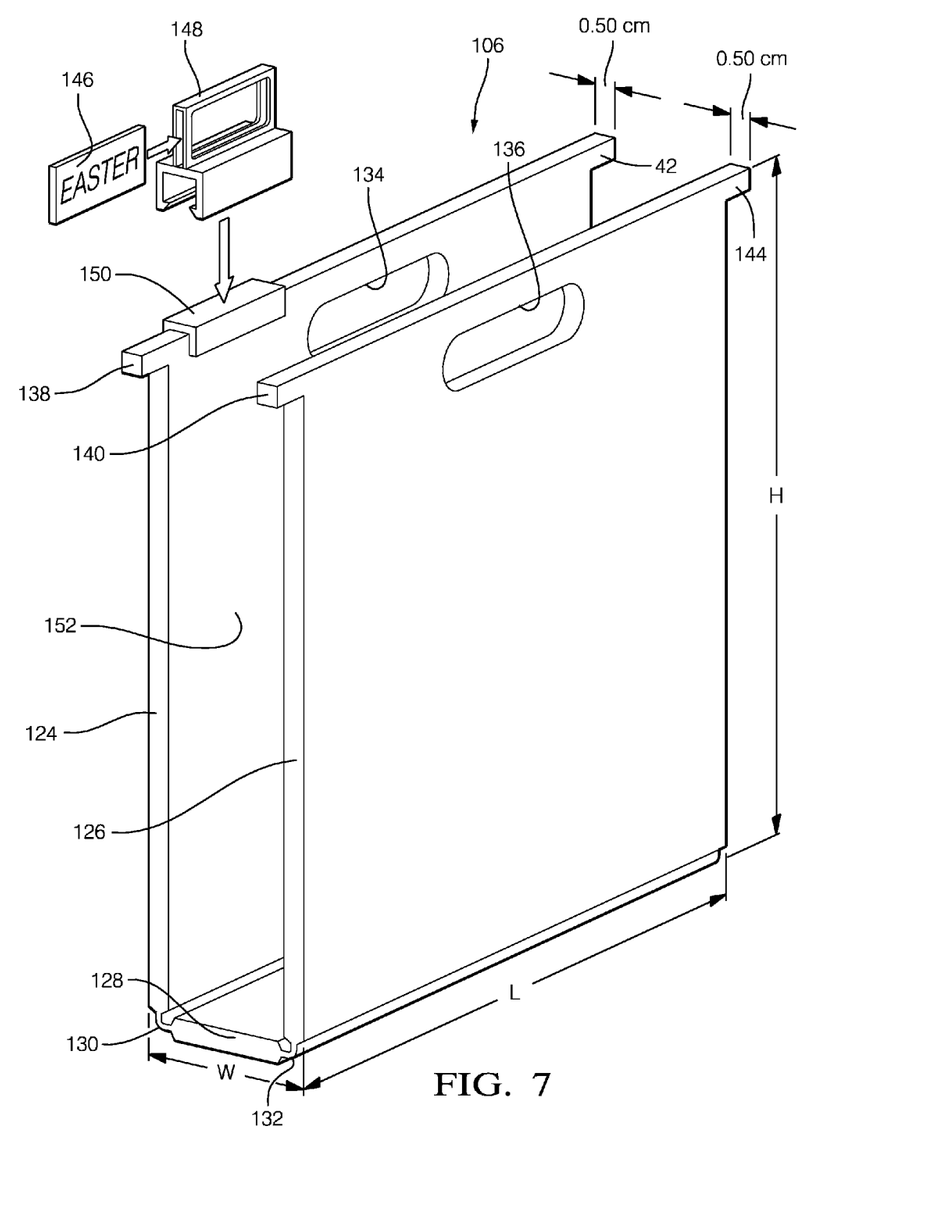
FIG. 7, is an exploded perspective view of a typical hanger configured for common usage with both containers of the bulletin board caddy assembly of FIG. 1 which are of incrementally varying width and are formed of relatively rigid panels joined by integral living hinges.

Referring to FIG. 7, a typical hanger 106 is illustrated. Each hanger 106 is preferably die-formed from 0.50 cm thick sheet material, such as plastic, composite or other suitable rigid material. Each hanger 106 is initially formed as a single piece (i.e., two dimensional blank) consisting of two side panels 124 and 126, and a bottom panel 128. After die forming, the two dimensional blank is folded into the illustrated configuration. As illustrated in FIG. 7, the bottom edge of side panel 124 is integrally joined to a left edge of the bottom panel 128 by a first living hinge 130. Similarly, the bottom edge of side panel 126 is integrally joined to a right edge of the bottom panel 128 by a second living hinge 132.

Simultaneously with the forming the side panels 124 and 126, the bottom panel 128 and the interconnecting living hinges 130 and 132, other details are formed in each hanger 106, including centered elongated hand-hold openings 134 and 136 located adjacent the upper edge of side panels 124 and 126, respectively, leftwardly extending support tabs 138 and 140 located at the upper left hand corners of side panels 124 and 126, respectively, and rightwardly extending support tabs 142 and 144 located at the upper right hand corners of side panels 124 and 126, respectively. To facilitate identification of a given hanger 106 and its contents, a label 146 is inserted within a label display holder 148 which, in turn, is affixed to an upper edge of one of the side panels 124 or 126 of the hanger 106 by a retainer 150 affixed to the hanger 106 by adhesive or the like.

Referring to FIGS. 3 and 7, the height "H" of each hanger 106 is slightly less than the depth of the rectangular cavity 34 of the outer storage container 12. The length "L" of each hanger 106 is slightly less than the width of the rectangular cavity 34 of the outer storage container 12 less two times the thickness of the inner flange portion 114 of the spacer combs 104. The width "W" of each hanger can be varied in 0.50 cm increments. Thus, hangers 106 can be provided with a variety of standard overall widths such as 1.50 cm, 2.50 cm, 3.50 cm, and the like, resulting in corresponding storage cavities of 0.50 cm, 1.50 cm, 2.50 cm, and the like.

A given hanger 106 can be inserted within the rectangular cavity 34 of the outer storage container 12 by inserting the tabs 138 and 142 of the first side panel 124 on a first laterally opposed set of ledge segments 120, and inserting the tabs 140 and 144 of the second side panel 124 on a second laterally opposed set of ledge segments 120, wherein the two sets of opposed ledge segments are longitudinally offset by a dimension corresponding to the width "W" of the hanger 106. Once so inserted, the tabs 138, 140, 142 and 144, and thus the hanger 106 and any contents, are blocked from longitudinal displacement by respective adjacent spacer segments 122, and blocked from lateral displacement by adjacent portions of the inner flange portions 114 of the spacer combs 104.

This arrangement ensures that a properly installed hanger 106 will remain fixed with respect to the outer storage container 12. Furthermore, the side panels 124 and 126 will remain suspended vertically within the storage cavity 34 and parallel to each other, while the bottom panel 128 will remain horizontal and normal to the side panels 124 and 126. This ensures that the storage volume 152 defined by the hanger 106 remains in a rectangular configuration, thereby protecting the edges and corners of the paper stock (e.g., posters) from becoming dog-eared. This is in contrast to conventional V-shaped folders which, when filled with bulletin board cut-outs, posters and the like, cause the top of the loaded folder to bulge, become top heavy, and possibly interfere with closing of the container, and hangers with bottoms that function as slings that tend to become rounded when loaded with paper stock, thereby damaging the contents of the hanger 106.

Figure 2:
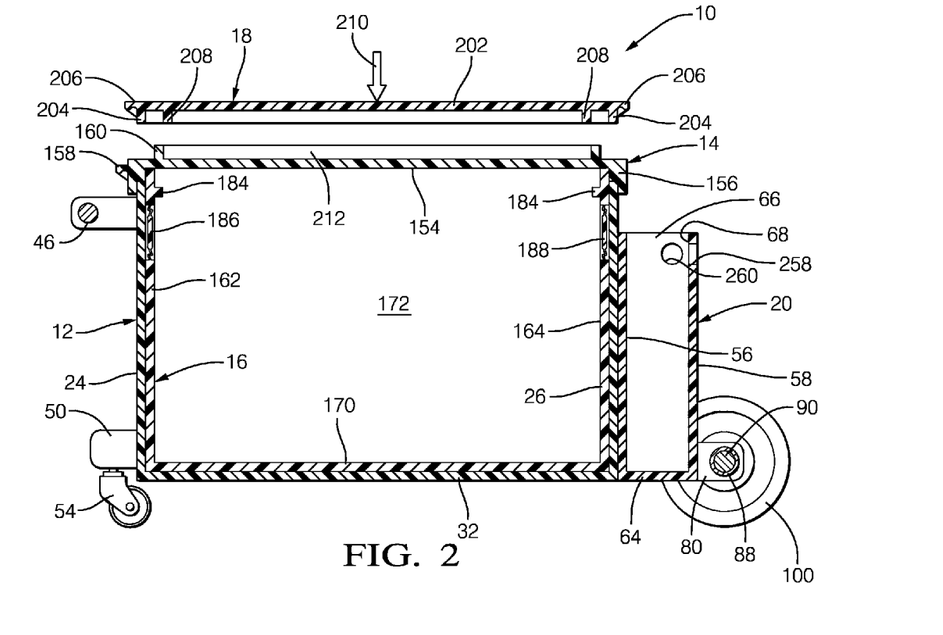
FIG. 2, is a cross-sectional plan view of the bulletin board caddy assembly of FIG. 1 in a consolidated configuration wherein only one of the two main containers is accessible.

Referring to FIGS. 1, 2 and 3, the reversible closure member 14 provides several varied functions when applied with the bulletin board caddy assembly 10. In its consolidated configuration illustrated in FIG. 2, wherein the hanger spacer combs have not yet been installed, the inner storage container 16 is nestingly slip fit within the outer storage container 12. The reversible closure member 14, in the orientation illustrated in FIG. 2 sealingly closes the opening 36 of the outer storage container 12. This configuration is intended for point of sale or long term storage without hangers 106 and hanger combs 104 being deployed. It is possible, with this configuration to employ hangers 106 within the inner storage container 16.

As best viewed in FIGS. 1, 2, 2A, 3 and 3A, the reversible closure member 14 is formed of resilient material such as rubber, vinyl or the like. The reversible closure member 14 constitutes a rectangular closure panel 154 with a stepped peripheral skirt 156 extending about the perimeter of the panel 154 and directed in a first direction away from a plane formed by the rectangular panel 154. The stepped peripheral skirt 156 includes at least one release tab 158 enabling manual releasing of the reversible closure member 14 simultaneously from the outer storage container 12 and the inner storage container 16 as well as "burping" the assembly 10 to apply a slight vacuum when applying the reversible closure member 14 to the outer storage container 12.

The reversible closure member 14 includes a second peripheral skirt 160 extending about the perimeter of the rectangular panel 154 and directed in an opposite direction from the stepped peripheral skirt 156.

The inner storage container 16 is rectangular in form, including left and right vertically extending planar end panels 162 and 164, respectively, front and rear vertically extending planar side panels 166 and 168, respectively, and a horizontally extending planar bottom panel 170. The end panels 162 and 164, side panels 166 and 168 and bottom panel 179 are integrally formed, such as with injection molded plastic material, to define a relatively rigid structure forming a rectangular cavity 172 which is entirely closed with the sole exception of a rectangular upwardly facing opening 174 defined by the uppermost continuous edges 176 and 178 of the end panels 162 and 164, respectively, and the uppermost continuous edges 180 and 182 of the front and rear side panels 166 and 168.

Referring to FIGS. 1, 2 and 3, in application, the opposed inner surfaces of the end panels 162 and 164 include opposed hanger, spacer combs 184 for supporting and positioning hangers 106 (illustrated in phantom) within the rectangular cavity 172 formed by the inner storage container 16. The spacer combs 184 are identical or form a mirror image of one another. Each spacer comb 184 is integrally formed with their respective end panels 162 and 164 of inner storage container 16 and are dimensionally and functionally identical to the spacer combs 104 in all other material respects. Furthermore, the lateral spacing between the ledge and spacer segments 120 and 122, respectively, of the opposed hanger spacer combs 104 are equal to those of the hanger spacer combs 184 of the inner storage container 16. Alternatively, the hanger spacer combs 184 could be removably mounted within the inner storage container 16, such as with threaded or self-engaging fasteners.

As best viewed in FIGS. 2, 3 and 4, the end panels 162 and 164 of the inner storage container 16 include bi-directional finger grips 186 and 188, respectively integrally formed therein. The bi-directional finger grips 186 and 188 comprise thinned areas 190 and 192, respectively, in the upper portions of end panels 162 and 164, respectively. Each thinned area 190 and 192 comprises an irregular center portion 194 and 196, respectively, interconnected with the peripherally surrounding portion of the associated end panel 162 and 164, respectively, by an accordion-like serpentine shaped web 198 and 200, respectively.

The finger grips 186 and 188 have several functions. When transitioning the stackable bulletin board caddy assembly 10 from a consolidated configuration illustrated in FIG. 2, to an expanded configuration in FIG. 3, after removing the upper closure member 18, an operator reaches within the rectangular cavity 172 formed by the inner storage container 16 and simultaneously manually depresses the irregular center portions 194 and 196 outwardly until they abut their respective adjacent inner surfaces of end panels 24 and 26, respectively, as illustrated in phantom. This establishes a localized recess or niche, and provides firm finger/hand hold on the inner storage container 16 which can then be removed from the outer storage container 12. Secondly, when lifting the inner storage container 16 after it has been filled with hangers 106 or other materials, an operator simultaneously manually depresses the irregular center portions 194 and 196 inwardly, as illustrated in phantom. This provides firm finger/hand hold on the exterior surfaces of the end panels 26 and 28 of the inner storage container 16 which can then be lifted and repositioned. Lastly, when an inner storage container 16 has been "burped" during application of the upper closure member 18, the resulting vacuum can be released or diminished by manually pressing the finger grips 186 and 188 inwardly by momentarily effectively reducing the overall volume of the inner storage container 16. Upon release of the irregular center portions 194 and 196 of the finger grips 186 and 188, respectively, the natural resilience of the material employed in fabricating the inner storage container 16 and the thinned serpentine shape of the webs 198 and 200, respectively, will cause the finger grips 186 and 188 to return to their original positions, illustrated in hard line.

As best viewed in FIGS. 1, 2, 3 and 6, the upper closure member 18 is formed of resilient material such as rubber, vinyl or the like. The upper closure member 18 constitutes a rectangular closure panel 202 with a peripheral skirt 204 integrally formed therewith and extending about the perimeter of the rectangular panel 202 and directed normally away from a plane formed by the rectangular panel 202. The rectangular panel 202 includes an opposing pair of release tabs 206 enabling manual releasing of the upper closure member 18 from the inner storage container 16 as well as "burping" the assembly 10 to apply a slight vacuum when applying the upper closure member 18 to the inner storage container 16.

Figure 6:
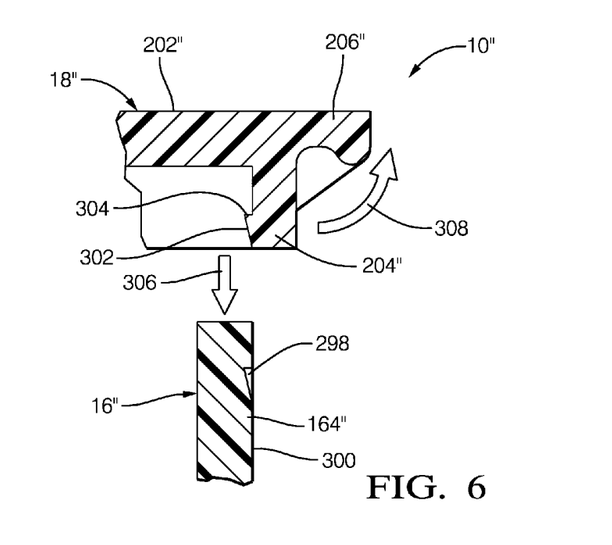
FIG. 6, is a broken, cross-sectional view of a self-engagement and manual release tab detail of the bulletin board caddy assembly of FIG. 1 on an enlarged scale.

The upper closure member 18 has a second peripheral skirt 208 integrally formed with the rectangular panel 202 and disposed radially inwardly from the outer peripheral skirt 204 extending about the perimeter of the rectangular panel 202 and directed normally away from a plane formed by the rectangular panel 202 parallel to the outer peripheral skirt 204.

Figure 2A:
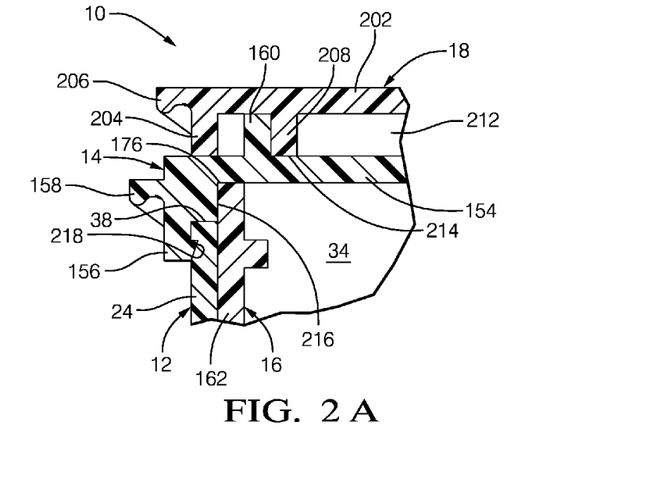
FIG. 2A, is a broken, cross-sectional plan view of a portion of the bulletin board caddy assembly of FIG. 2 on a greatly enlarged scale illustrating the typical interfit of the reversible closure member with the upper edge of the outer storage container.

Referring to FIGS. 2 and 2A, in the consolidated configuration of the stackable bulletin board caddy assembly 10, the upper closure member 18 is mounted atop the reversible closure member 14. The second peripheral skirt 160 of the reversible closure member 14 and the second peripheral skirt 208 of the upper closure member 18 are dimensioned and positioned such that the inner edge surface of the second peripheral skirt 160 of the reversible closure member 14 is in a slip-fit or slight interference fit with the outer edge surface of the second peripheral skirt 208 of the upper closure member 18, holding them in assembly when pressed together as indicated by arrow 210. So arranged, the rectangular panel 202 of the upper closure member 18 is spaced above the rectangular panel 154 of the reversible closure member 14, forming a shallow rectangular cavity 212 there between suitable for storage of large rectangular paper stock/poster boards, loose parts (e.g., the hanger spacer combs 104 prior to installation), instruction and warranty documents, silica gel packets, and the like. The upper closure member 18 can be easily removed from its installed position on the reversible closure member 14 simply by grasping one or both of the release tabs 206 and lifting upwardly. If desired, the upper closure member 18 can remain in situ with the reversible closure member 14 as the reversible closure member 14 is being applied to or removed from the outer storage container 12.

Referring to FIGS. 2 and 2A, the stepped peripheral skirt 156 of the reversible closure member 14 forms a radially inner vertical surface 216 and a radially outer vertical surface 218 extending about its entire parameter. When in the consolidated configuration of the bulletin board caddy assembly 10, inner vertical surface 216 is in slip fit or slight interference fit with the upper outer surfaces of end panels 162 and 164 and side panels 166 and 168 of the inner storage container 16 adjacent edges 176, 178, 180 and 182, respectively. Simultaneously, outer vertical surface 218 is in slip fit or slight interference fit with the upper outer surfaces of end panels 24 and 26 and side panels 28 and 30 of the outer storage container 12 adjacent edges 38, 40, 42 and 44, respectively. This arrangement simultaneously hermetically seals the concentrically nested inner and outer storage containers 12 and 16, respectively. Although the upper surface of body 108 of each hanger spacer comb 104 is illustrated as extending slightly above edges 38, 40, 42 and 44, preferably, they should be flush to ensure sealing engagement with the reversible closure member 14. This could be accomplished by providing mating recess notches (not illustrated) in edges 38 and 40 of end panels 24 and 26 or additional hanger spacer combs (not illustrated) extending along edges 42 and 44 of side panels 28 and 30.

Referring to FIGS. 3 and 3A, in the expanded configuration of the stackable bulletin board caddy assembly 10, the upper closure member 18 is mounted atop the inner storage container 16, covering upwardly facing opening 174 to substantially hermetically enclose rectangular cavity 172. A plurality of hangers 106 can be arranged within rectangular cavity 172, suspended from hanger spacing combs 184 such as described with relation to the arrangement of hangers 106 within the rectangular cavity 34 of the outer storage container 12. It is important to note that, although the inner and outer containers 16 and 12, respectively, are of slightly differing interior dimensions, they accommodate commonly dimensioned hangers 106. When the upper closure member 18 is installed as illustrated in FIG. 3, the downwardly facing surface 214 of the second peripheral skirt 208 bears downwardly against any hangers 106 installed within the rectangular cavity 172, effectively locking them in place.

Referring to FIGS. 3 and 3A, in the expanded configuration of the stackable bulletin board caddy assembly 10, the stepped peripheral skirt 156 of the reversible closure member 14 is reversed and directed upwardly, wherein the inner vertical surface 216 is in slip fit or slight interference fit with the lower outer surfaces of end panels 162 and 164 and side panels 166 and 168 of the inner storage container 16 adjacent bottom panel 170 to releasably retain the inner storage container 16 in a stacked relationship atop the outer storage container 12. Simultaneously, a circumferentially continuous outer vertical surface of the second peripheral skirt 160 of the reversible closure member 14 is in slip fit or slight interference fit with both the inwardly facing surfaces of the inner flange portions 112 of the hanger spacer combs 104 affixed to the upper edges 38 and 40 of the end panels 24 and 26 respectively, as well as the upper edges of the side panels 28 and 30 of the outer storage container 12, respectively. When the reversible closure member 14 is installed as illustrated in FIG. 3A, the downwardly facing surface 220 of the second peripheral skirt 160 bears downwardly against any hangers 106 installed within the rectangular cavity 34, effectively locking them in place.

Referring to FIGS. 1, 2 and 3, the trim storage bin 22 is elongated and rectangular in form, including front and rear vertically extending side panels 222 and 224, upper and lower horizontally extending end panels 226 and 228, respectively, a vertically extending back panel 230, and a vertically extending sliding access/door panel 232. The side panels 222 and 224, end panels 226 and 228, and back panel 230 are integrally formed, such as with injection molded plastic material, to define a relatively rigid structure forming a rectangular cavity 234 which is entirely closed with the sole exception of a rectangular rightwardly facing opening 236 defined by the right-hand-most continuous vertical edges 238 and 240 of the side panels 222 and 224, respectively, and the right-hand-most continuous horizontal edges 242 and 244 of the top and bottom end panels 226 and 228. Edges 238, 242 and 244 of front side panel 222, top end panel 226 and bottom end panel 228 fall on a common vertical plane, while edge 240 of rear side panel 224 extends parallel to the common vertical plane but offset leftwardly therefrom.

Inwardly opening grooves 246, 248 and 250 are formed in the inner surfaces of the front side panel 222, top end panel 226 and bottom end panel 228, respectively and are leftwardly offset from edges 238, 242 and 244 of front side panel 222, top end panel 226 and bottom end panel 228, respectively. Collectively, grooves 246, 248 and 250 are in the form of a "C", opening rightwardly adjacent to the edge 240 of rear side panel 224. The nominal width of the grooves 246, 248 and 250 is slightly greater than the nominal thickness of the access panel 232, which is preferably integrally formed, such as with injection molded plastic material. The nominal depth of the grooves 246, 248 and 250 is preferably within the range of 0.33-0.50 of the common nominal thickness of the side panels 222 and 224, and end panels 226 and 228, respectfully. The opening 236 of the rectangular cavity 234 formed by the trim storage bin 22 is selectively opened and closed by the access panel 232 slidingly disposed within the "C" shaped grooves 246, 248 and 250, as illustrated by an arrow 252.

Manipulation of the access panel 232 is best effected by grasping a "D" shaped finger hole 254 vertically centrally formed in the access panel 232 adjacent the right—hand edge thereof. Lockable security can be provided by the addition of small through holes 256, 258 and 260 formed in rear side panel 224 of the trim storage bin 22, and in the right end panel 58 and rear side panel 62 of the receiver 20. When the access panel 232 is closed and the lower end of the trim storage bin 22 is disposed within rectangular cavity 66 of the receiver, as best illustrated in FIG. 3, a cable lock (not illustrated) or similar device can be dressed serially through finger hole 254 and through hole 256 of the trim storage bin 22, and through holes 258 and 260 of the receiver 20 and secured in a continuous loop, preventing unauthorized access to the trim storage bin 22.

The opposed inner surfaces of the top and bottom end panels 226 and 228 of the trim storage bin 22 form cooperating divider positioning combs 263, each comb 263 forming a continuous succession of mirror image alternating groves and lands 262 and 264, respectively. The grooves and lands 262 and 264, respectively, all extend the entire minor dimension of the opposed end panels 226 and 228 between the back panel 230 and the "C" shaped grooves 246, 248 and 250. Each of a plurality of spacer panels 266 can be inserted within the rectangular cavity 234 of the trim storage bin 22 with the opposed end surfaces of each elongated divider or spacer board 266 engaging an opposed aligned pair of grooves 262, and longitudinally held in place by adjacent pairs of lands 264. In application, the longitudinal spacing between adjacent pairs of spacer panels 266 can be re-adjusted according to the user's requirements.

This arrangement allows use of an elongated trim storage bin 22 which can be significantly longer than that the lateral dimensions of the rectangular cavities 34 and 172 of either of the storage containers 12 and 16. Decorative trim for bulletin board usage is frequently available in standardized dimensions exceeding standard dimensions of bulletin board poster boards dimensioned for form fitting in the storage containers 12 and 16. Accordingly, the present arrangement enables secured vertical storage of decorative trim without exceeding the basic width and depth spatial envelope of the overall stackable bulletin board caddy assembly 10.

Figure 8A:
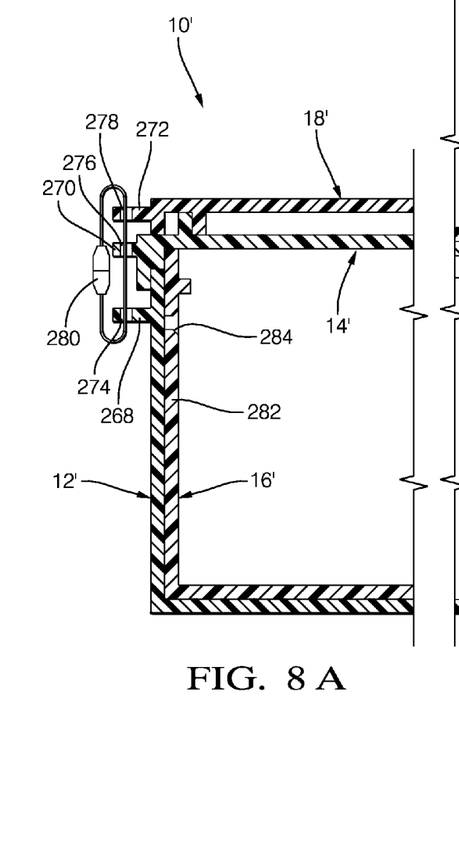
FIG. 8A, is a simplified, schematic longitudinal cross-sectional view of an additional reconfigurable locking system feature of the present invention when the all-in-one stackable bulletin board caddy assembly in a consolidated configuration.
Figure 8B:
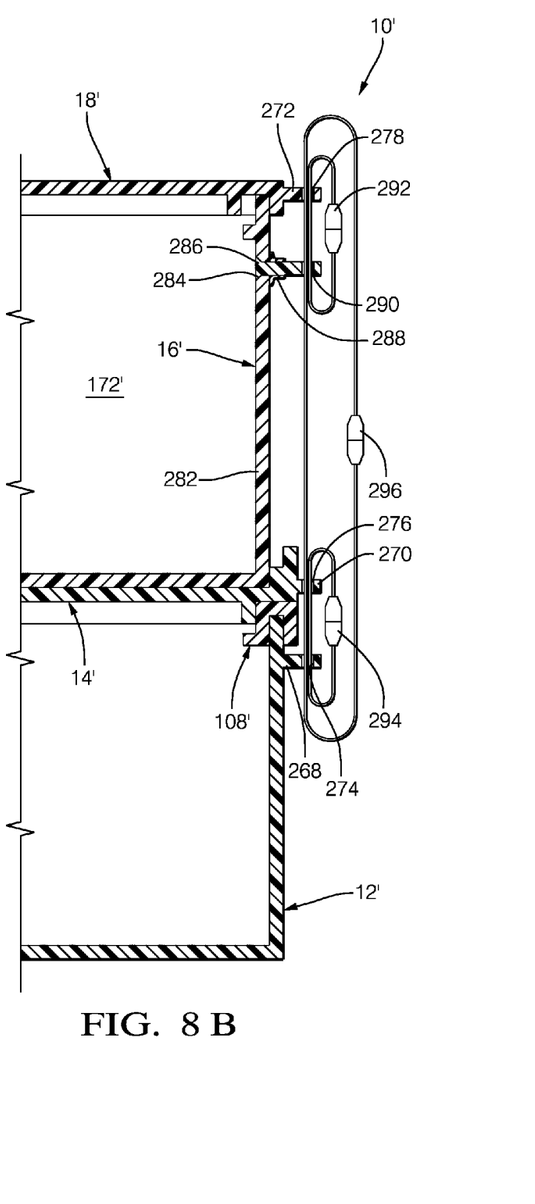
FIG. 8B, is a simplified, schematic longitudinal cross-sectional view of the reconfigurable locking system feature of the present invention when the all-in-one stackable bulletin board caddy assembly in an expanded configuration.

Referring to FIGS. 8A and 8B, a locking system for a stackable bulletin board caddy assembly 10' is illustrated. Usage of numerical primes (e.g., 10') indicates that the designated element is substantially similar to an earlier described element identified by the same number (e.g., 10) except as expressly described. The stackable bulletin board caddy assembly 10' comprises an outer storage container 12', a reconfigurable closure member 14', an inner storage container 16', and an upper closure member 18' configured for nesting or vertical stacking. The outer storage container 12' supports a receiver (not illustrated) for supporting a trim storage unit (not illustrated).

FIG. 8A illustrates the stackable bulletin board caddy assembly 10' in the consolidated configuration, and FIG. 8B illustrates the stackable bulletin board caddy assembly 10' in the expanded configuration. The outer storage container 12', the reconfigurable closure member 14', and the upper closure member 18' each have an associated outwardly extending locking tab 268, 270 and 272, respectively, integrally formed therewith. Each locking tab 268, 270 and 272 forms a through hole 274, 276 and 278, respectively. When the stackable bulletin board caddy assembly 10' is in the consolidated configuration illustrated in FIG. 8A, the through holes 274, 276 and 278 are in substantially axial alignment for serially receiving a security device such as a cable lock 280 which can be secured in a continuous loop, preventing unauthorized access to the contents of the stackable bulletin board caddy assembly 10' or removal/separation of any of the elements.

When the stackable bulletin board caddy assembly 10' is in the expanded configuration illustrated in FIG. 8B, the through holes 274, 276 and 278 remain in substantially axial alignment. Additionally, a side panel 282 of the inner storage container 16' has a tapered through hole 284 formed therein for receiving a removable locking tab 286. The removable locking tab 286 is constructed similarly to a blind rivet, to provide secure retention to the side wall 282, while avoiding intrusion into the rectangular cavity 172' of the inner storage container 16'. The removable locking tab 286 can be affixed in its illustrated position by a temporary retainer 288 and extends outwardly from the side panel 282. The removable locking tab 286 forms a through hole 290 which is axially aligned with the through holes 274, 276 and 278 of locking tabs 268, 270 and 272, respectively. Preferably, two sets of locking tabs 268, 270, 272 and 286 are provided, one at each opposed end of the stackable bulletin board caddy assembly 10. However, fewer or more sets of locking tabs 268, 270, 272 and 286 are provided, depending on the level of security desired.

The configuration of FIG. 8B, a first security device such as a cable lock 292 which can be serially routed or dressed through through holes 278 and 290 of locking tabs 272 and 286, respectively, and secured in a continuous loop, preventing unauthorized access to the contents of the inner storage container 16'. Additionally, a second security device such as a cable lock 294 which can be serially routed or dressed through through holes 274 and 276 of locking tabs 268 and 270, respectively, and secured in a continuous loop, preventing unauthorized access to the contents of the outer storage container 12'. This arrangement enables removal and repositioning of a sub-assembly consisting of the (secured) inner storage container 16' and upper closure member 18' independently of the (secured) outer storage container 16' and reversible closure member 14'.

Alternatively, a single, third security device such as a cable lock 296 (with an extended cable) can be serially routed or dressed through through holes 274, 276, 290 and 278 of locking tabs 268, 270, 286 and 272, respectively, and secured in a single continuous loop, simultaneously preventing unauthorized access to the contents of either the outer storage container 12' or the inner storage container 16', while ensuring that the entire stackable bulletin board caddy assembly 10' remains intact.

Referring to FIG. 6, an additional feature enhancing the robustness of the engagement of a closure member 18" to a panel 164" of a container 16" is illustrated. This feature can be employed at various locations with the reversible closure member 14 and the upper closure member 18 described herein above. A recess feature including an abutment surface 298 is formed in an outer wall surface 300 of an end panel 164" of an inner storage container 16". The inner mating surface of a peripheral skirt 204" of an upper closure member 18" forms a ramped surface 302 ending in an abutment surface 304 positionally aligned with the ramped feature 298.

As the closure member 18" is applied over the panel 164" of the container 16", as indicated by an arrow 306, the free end of the skirt 204" is momentarily resiliently deformed outwardly until the abutment feature of the panel 164" registers with the abutment surface 304 of the skirt 204". At that time, the natural resilience of the material forming the closure member 18" causes the skirt 204" to snap back to its initial position, effecting positive engagement between the abutment surfaces 298 and 304. Thereafter, the closure member 18" can only be removed from the container 16" by manually grasping the release tab 206" and bending it upwardly, causing the free end of the adjacent skirt 204" to rotate outwardly as indicated by an arrow 308. This, in turn, disengages the two abutment surfaces 298 and 304, freeing the closure member 18" for removal from the container 16".

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, the major components of the stackable bulletin board caddy assembly 10 can be formed of other suitable materials, such as metal or composite materials, as long as overall rigidity, low expense, lightweight, hermetic sealing properties and corrosion resistance are maintained. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A reconfigurable bulletin board caddy comprising:
a generally rectangular outer container having integrally formed left and right end panels, front and rear side panels and a bottom panel collectively defining a rectangular cavity, said panels having respective upper edge portions forming an upwardly facing opening;
a generally rectangular inner container having integrally formed left and right end panels, front and rear side panels and a bottom panel collectively defining a rectangular cavity, said panels having respective upper edge portions forming an upwardly facing opening,
wherein said outer and inner containers are configured to effect a slip-fit nesting engagement there-between; and
a reversible closure member including a generally planar closure panel, a first stepped peripheral skirt extending normally from said planar closure panel in a first direction, and a second peripheral skirt extending normally from said planar closure panel in a second opposite direction,
wherein said first stepped peripheral skirt forms a first circumferential engagement surface and a second circumferential engagement surface radially offset from said first circumferential engagement surface,
wherein said first circumferential engagement surface is operative to sealingly engage the opening of said outer container and said second circumferential engagement surface is operative to simultaneously sealingly engage the opening of said inner container when said second container is nestingly disposed within said first container, and
wherein said second peripheral skirt is operative to sealingly engage the opening of said outer container and said second circumferential engagement surface is operative to simultaneously engage the bottom panel of said inner container when said inner container is removed from said outer container.

2. The reconfigurable bulletin board caddy of claim 1, further comprising a second closure member operative to sealingly engage the opening of said inner container when said inner container is removed from said outer container.

3. The reconfigurable bulletin board caddy of claim 2, wherein said second closure member includes a generally planar closure panel, a first outer peripheral skirt and a second inner peripheral skirt extending normally from said planar closure panel in a common direction,
wherein said first outer peripheral skirt is operative to sealingly engage the opening of said inner container when said inner container is removed from said outer container, and
wherein said second inner peripheral skirt is operative to sealingly engage the second peripheral skirt of said reversible closure member when said second container is nestingly disposed within said first container.

4. The reconfigurable bulletin board caddy of claim 3, wherein the planar closure panel of said reversible closure member and said inner closure panel and inner peripheral skirt of said second closure member form a third cavity.

5. The reconfigurable bulletin board caddy of claim 1, further comprising a first pair of cooperating opposed hanger supporting combs carried on the end panels of said outer container, and a second pair of opposed hanger supporting combs carried on the end panels of said inner container.

6. The reconfigurable bulletin board caddy of claim 5, wherein said first pair of cooperating opposed hanger supporting combs and said second pair of cooperating opposed hanger supporting combs are laterally dimensionally equidistant, enabling application of commonly dimensioned hangers within both said inner and outer containers.

7. The reconfigurable bulletin board caddy of claim 1, further comprising:
a generally rectangular receiver container having integrally formed left and right end panels, front and rear side panels and a bottom panel collectively defining a rectangular cavity forming an upwardly facing opening; and
a trim storage bin having integrally formed front and rear side panels, left and right end panels and a bottom panel collectively defining a rectangular cavity forming a laterally outwardly facing opening, said trim storage bin having a movable panel operative for selective displacement between an open position and a closed position,
wherein said movable panel is locked within said closed position whenever said trim storage bin is disposed within the rectangular cavity of said receiver,
wherein said left end panel is integrally formed with the right end panel of said outer storage container, and
wherein said trim storage bin is vertically elongated and has a characteristic nominal vertical dimension of substantially twice the nominal vertical dimension of said recess.

8. The reconfigurable bulletin board caddy of claim 7, wherein said trim storage bin further comprises a pair of cooperating opposed divider supporting combs carried on the top and bottom end panels of said trim storage bin, said divider supporting combs operative to support at least one selectively positioned vertically elongated divider panel.

9. The reconfigurable bulletin board caddy of claim 7, wherein said movable door panel and at least one of said side panels forms a through passage operable for digital manipulation or through passage of a lockable device.

10. The reconfigurable bulletin board caddy of claim 9, wherein the through passages of said movable door panel and at least one of said side panels register with through passages formed in an end panel and a side panel of said receiver, whereby said lockable device is further operative to retain said trim storage bin within said receiver.

11. The reconfigurable bulletin board caddy of claim 5, wherein said second peripheral skirt of said reversible closure member defines an abutment surface which, when the inner container has been removed from said outer container, is operative to lock any hangers within said outer storage container respective combs.

12. The reconfigurable bulletin board caddy of claim 5, wherein said second peripheral skirt of said upper closure member defines an abutment surface which, when the upper closure member is applied to said inner container, is operative to lock any hangers within said inner storage container respective combs.

13. The reconfigurable bulletin board caddy of claim 1, further comprising resilient handhold features integrated within at least one of the end panels of said inner container, said at least one handhold including a central rigid finger grip portion resiliently interconnected with adjacent end panel structure through an intermediate thin serpentine shaped web enabling inward and outward bi-directional manual displacement.

14. The reconfigurable bulletin board caddy of claim 1, wherein said outer container, said reversible closure member and said upper closure member each comprise an integrally formed outwardly extending locking tab, each said locking tab forming a through hole positioned in relative axial alignment with the other through holes for serial reception of a locking security device when said inner container is disposed within said outer container.

15. The reconfigurable bulletin board caddy of claim 14, further comprising an outwardly extending locking tab, said outwardly extending locking tab selectively mounted to said inner container when said inner container is removed from said outer container, said outwardly extending locking tab forming a through hole positioned in relative axial alignment with the other said through holes for serial reception of said locking security device.

16. The reconfigurable bulletin board caddy of claim 3, wherein at least one of said stepped peripheral skirt of said reversible closure member or the outer peripheral skirt of said upper closure member has an abutment surface formed in a sidewall thereof in sliding contact with an adjacent outer or inner container end panel, respectively, and wherein said adjacent closure member abutment surface has a complimentarily formed sidewall abutment surface operable to lockingly self-engage said closure member abutment surface upon installation of said reversible closure member or said upper closure member.

17. The reconfigurable bulletin board caddy of claim 16, wherein at least one of said stepped peripheral skirt of said reversible closure member or the outer peripheral skirt of said upper closure member has an integrally formed outwardly directed release handle operable to locally resiliently displace a portion of said skirt to release engagement of said abutment surfaces.

18. The reconfigurable bulletin board caddy of claim 5, further comprising at least one hanger supported within said outer container by said hanger support combs, said hanger comprising first and second parallel vertical side panels integrally interconnected by a horizontal bottom panel, each said side panel having integrally formed opposed longitudinally extending locating tabs engaging said combs, and
wherein each of said side panels and said bottom panel are commonly formed of rigid injection molded material, and wherein each of said side panels are interconnected to said bottom panel by parallel living hinges.

19. The reconfigurable bulletin board caddy of claim 1, further comprising a plurality of wheels mounted adjacent the bottom panel of said outer container to support the weight of said reconfigurable bulletin board caddy, and at least one pull handle integrally formed on an outer wall of one of said panels of said outer container.

20. A reconfigurable bulletin board caddy comprising:
an outer container defining a rectangular cavity and an upwardly facing opening;
an inner container defining a rectangular cavity and an upwardly facing opening,
wherein said outer and inner containers are configured to effect a slip-fit nesting engagement there-between; and
a reversible closure member including a closure panel, a first stepped peripheral skirt extending normally from said closure panel in a first direction, and a second peripheral skirt extending normally from said closure panel in a second opposite direction,
wherein said first stepped peripheral skirt forms a first circumferential engagement surface and a second circumferential engagement surface radially offset from said first circumferential engagement surface,
wherein said first circumferential engagement surface is operative to sealingly engage wall edges adjacent the opening of said outer container and said second circumferential engagement surface is operative to simultaneously sealingly engage wall edges adjacent the opening of said inner container when said second container is disposed within said first container, and
wherein said second peripheral skirt is operative to sealingly engage the opening of said outer container and said second circumferential engagement surface is operative to simultaneously engage a bottom panel of said inner container when said inner container is removed from said outer container.

\* \* \* \* \*